United States Patent
Sakamoto et al.

(10) Patent No.: US 10,562,393 B2
(45) Date of Patent: Feb. 18, 2020

(54) HUNTING CONTROL DEVICE FOR VEHICLE WITH DCT TRANSMISSION

(71) Applicant: HONDA MOTOR CO., LTD., Tokyo (JP)

(72) Inventors: Naoki Sakamoto, Wako (JP); Shinya Nishiyama, Wako (JP); Dai Arai, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 63 days.

(21) Appl. No.: 15/916,657

(22) Filed: Mar. 9, 2018

(65) Prior Publication Data
US 2018/0281590 A1    Oct. 4, 2018

(30) Foreign Application Priority Data
Mar. 29, 2017  (JP) .................... 2017-065052

(51) Int. Cl.
*F16H 61/10* (2006.01)
*B60K 17/35* (2006.01)
(Continued)

(52) U.S. Cl.
CPC ........ *B60K 17/3505* (2013.01); *B60K 17/344* (2013.01); *B60K 17/348* (2013.01);
(Continued)

(58) Field of Classification Search
CPC ..................................................... F16H 61/10
See application file for complete search history.

(56) References Cited

U.S. PATENT DOCUMENTS

2011/0004380 A1* 1/2011 Kojima ............... F16D 48/0206
                                                          701/53
2012/0312657 A1* 12/2012 Jiang .................... F16H 61/688
                                                          192/103 R
(Continued)

FOREIGN PATENT DOCUMENTS

| JP | 1-229722 A | 9/1989 |
| JP | 2009-19659 A | 1/2009 |
| JP | 2016-17633 A | 2/2016 |

OTHER PUBLICATIONS

Japanese Notification of Reasons for Refusal for Japanese Application No. 2017-065052, dated Dec. 5, 2018, with English translation.

*Primary Examiner* — Tisha D Lewis
(74) *Attorney, Agent, or Firm* — Birch, Stewart, Kolasch & Birch, LLP (57) ABSTRACT

A basic clutch capacity calculating unit calculates a clutch capacity of the DCT applying an engine speed, a degree of throttle opening, and a front wheel vehicle speed to a map. The basic clutch capacity calculating unit further calculates the DCT basic clutch capacity by amending the basic clutch capacity based on an oil temperature and a water temperature. An NE converted value calculating unit calculates an NE converted value obtained by converting a vehicle speed into an engine speed with the front wheel vehicle speed and a DCT speed change stage as input parameters. A hunting detecting unit detects hunting by comparing the engine speed with the NE converted value when a throttle operation is detected. A DCT clutch capacity correcting unit makes decreasing correction of a DCT clutch capacity when hunting is detected for suppressing the hunting.

19 Claims, 7 Drawing Sheets

(51) Int. Cl.
*F16D 48/02* (2006.01)
*F16D 48/06* (2006.01)
*B60K 17/348* (2006.01)
*B60K 17/344* (2006.01)

(52) U.S. Cl.
CPC ......... *F16D 48/0206* (2013.01); *F16D 48/06* (2013.01); *F16D 2500/3065* (2013.01); *F16D 2500/3067* (2013.01); *F16D 2500/3068* (2013.01); *F16D 2500/30803* (2013.01); *F16D 2500/3108* (2013.01); *F16D 2500/3109* (2013.01); *F16D 2500/3144* (2013.01); *F16D 2500/3163* (2013.01); *F16D 2500/31446* (2013.01); *F16D 2500/50227* (2013.01); *F16D 2500/50236* (2013.01); *F16D 2500/7027* (2013.01); *F16D 2500/7041* (2013.01); *F16D 2500/70458* (2013.01); *F16D 2500/70605* (2013.01); *F16D 2500/70673* (2013.01)

(56) References Cited

U.S. PATENT DOCUMENTS

| | | | |
|---|---|---|---|
| 2015/0307098 A1* | 10/2015 | Maeda | B60W 30/143 477/120 |
| 2016/0003312 A1 | 1/2016 | Kim | |
| 2017/0166186 A1* | 6/2017 | Kim | B60W 20/15 |
| 2019/0178416 A1* | 6/2019 | Terwart | F16H 61/0251 |

* cited by examiner

HUNTING CONTROL DEVICE FOR VEHICLE WITH DCT TRANSMISSION

CROSS-REFERENCE TO RELATED APPLICATIONS

The present application claims priority under 35 USC 119 to Japanese Patent Application No. 2017-065052 filed Mar. 29, 2017 the entire contents of which are hereby expressly incorporated by reference.

The present invention relates to a hunting control device suitable for controlling hunting that tends to occur at a time of a start at a very low speed in a vehicle with a DCT transmission which vehicle has an engine and a driving wheel coupled to each other via a DCT (Dual Clutch Transmission) and a propeller shaft.

BACKGROUND ART

Patent Document 1 discloses a technology that controls clutch connection to prevent hunting caused by a residual torsion of a driving system due to a rotational speed difference between a front wheel (left wheel) and a rear wheel (right wheel) during traveling of a vehicle.

Patent Document 2 discloses a technology that measures a rotational speed difference between a front wheel and a rear wheel in a four-wheel-drive vehicle having a device controlling distribution of a driving force to the front and rear wheels, and which prevents hunting of a control system which hunting occurs when the driving force distribution is realized by feedback of the rotational speed difference.

CITATION LIST

Patent Literature

Patent Document 1: JP 2009-019659 A
Patent Document 2: JP H01-229722 A

SUMMARY OF INVENTION

Technical Problem

There are various modes of hunting caused by the residual torsion of the driving system, and a method of detecting the hunting and a method of dealing with the hunting need to be considered according to a cause of occurrence of the hunting and timing of occurrence of the hunting. The inventor of the present invention et al. experienced that hunting occurred at such a level that a vehicle body wobbled to and fro when a degree of throttle opening was repeatedly changed from a fully closed state to a slightly opened state to a fully opened state . . . at a very low speed (at a speed almost close to that of a start), and that an abnormal sound occurred at the same time.

Then, when the cause was investigated, it was found out that vehicle body behavior changed due to an effect of deceleration torque occurring at a throttle OFF time when a throttle was turned on/off at a very low speed, and thereby a foot of a driver moved, thus slightly moving the throttle. Further, it was newly found that this repeatedly triggered acceleration G and deceleration G, leading to pitching behavior.

Figure 5:
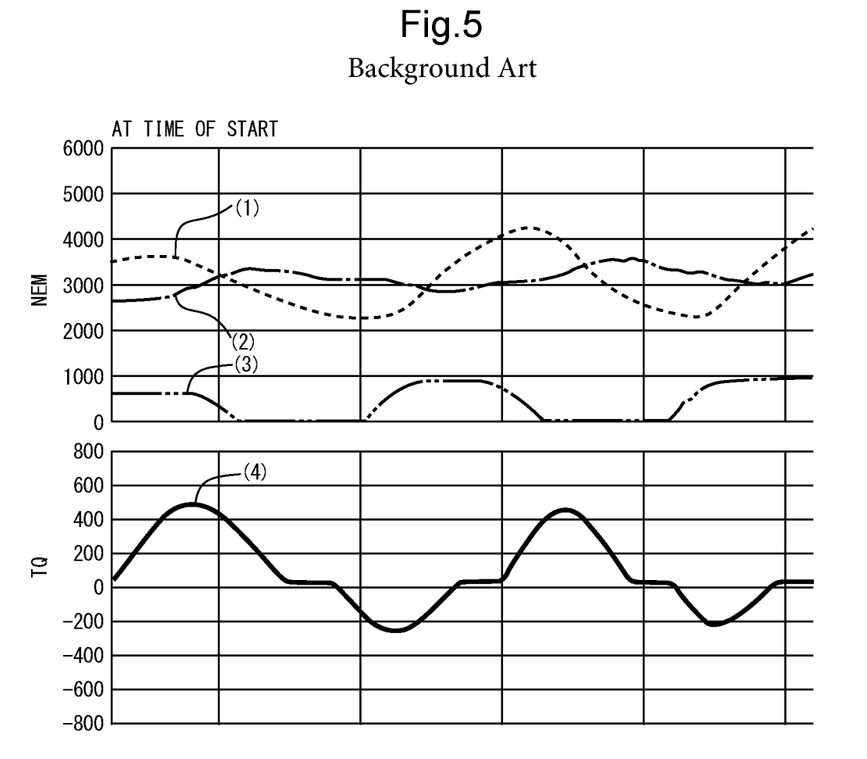
FIG. 5 is a diagram comparing synchronization relation of engine speed, an NE converted value, a degree of throttle opening and generated shaft torque of the propeller shaft at a time of a start of a vehicle.
Figure 6:
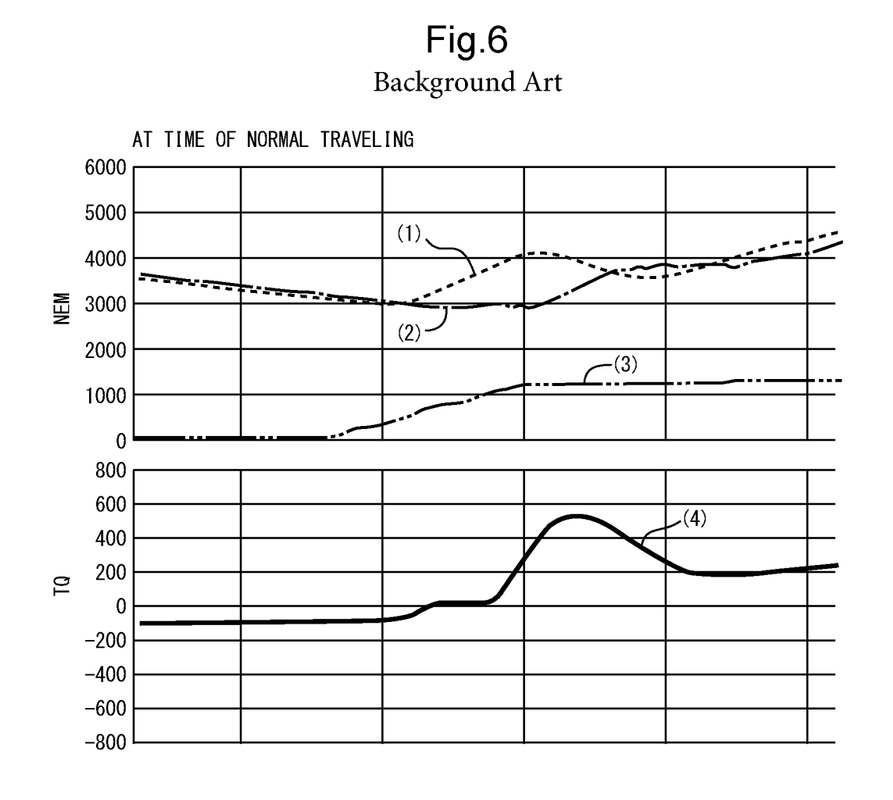
FIG. 6 is a diagram comparing synchronization relation of engine speed, an NE converted value, a degree of throttle opening and generated shaft torque of the propeller shaft at a time of a normal traveling of a vehicle.

FIGS. 5 and 6 are diagrams comparing synchronization relation of (1) engine speed, (2) an NE converted value obtained by converting the rotational speed of a driving wheel into an engine speed on the basis of the gear ratio of a DCT, and (3) a degree of throttle opening (upper) in relation to (4) generated shaft torque TQ of the propeller shaft (lower) at a time of a start (FIG. 5) and normal traveling (FIG. 6) of a vehicle with a DCT transmission which vehicle has an engine and a driving wheel coupled to each other via a clutch mechanism and a propeller shaft.

During normal traveling, as depicted in FIG. 6, when a throttle ON operation increases the engine speed, the engine speed exceeds the NE converted value due to a residual torsion of the driving system, and in synchronism with this, the generated shaft torque of the propeller shaft also increases. However, a difference between the NE converted value and the engine speed increases only once, and therefore does not lead to pitching behavior.

On the other hand, at a time of a start at a very low speed, as depicted in FIG. 5, it can be confirmed that vehicle body behavior changes due to an effect of deceleration torque occurring at a throttle OFF time, and thereby a foot of a driver moves, thus changing the throttle, and that this repeatedly triggers acceleration and deceleration, which leads to pitching behavior.

It is an object of the present invention to provide a hunting control device for a vehicle with a DCT transmission which hunting control device can suppress hunting, which tends to occur at a time of a start, by controlling a DCT capacity in the vehicle with the DCT transmission in particular.

Solution to Problems

To achieve the afore-mentioned object, the present invention is characterized by following constitutions in a hunting control device for a vehicle with a DCT transmission, the vehicle causing a driving force from an engine to be transmitted to a driving wheel via the DCT transmission and a propeller shaft.

(1) The present invention includes a means for detecting engine speed, means for detecting a rotational speed of the driving wheel means (40) for calculating an NE converted value obtained by converting the rotational speed of the driving wheel into an engine speed on a basis of a gear ratio of the DCT transmission, means (50) for detecting occurrence of hunting by comparing the NE converted value with the engine speed and means (60) for making decreasing correction of a DCT clutch capacity when hunting is detected.

(2) The present invention further includes means (51) for detecting an accelerating or decelerating operation on a basis of a change in a degree of throttle opening, wherein the means (50) for detecting the occurrence of the hunting includes deceleration torque hunting detecting means (52) for detecting hunting due to deceleration torque when the engine speed is smaller than a value obtained by subtracting a predetermined torsion index value $\alpha1$ from the NE converted value in a case where an accelerating operation is detected.

Advantageous Effects of Invention

According to the present invention, the following effects are achieved.

(1) The present invention calculates an NE converted value, which is obtained by converting the rotational speed of a driving wheel into an engine speed on the basis of the gear ratio of a DCT, and a residual torsion of the driving system is measured by comparing the NE converted value and the engine speed with each other. Thus, it is possible to measure the torsion of the driving system quantitatively without separately providing a dedicated mechanism for detecting the torsion.

(2) The present invention detects an accelerating or decelerating operation on the basis of a change in a degree of throttle opening, and performs hunting suppressing control on condition that a throttle ON operation or a throttle OFF operation be detected. Thus, the hunting suppressing control can be prevented from being performed in conditions in which hunting cannot occur because no accelerating or decelerating operation is performed even when a residual torsion occurs in the driving system. Hence, it is possible to detect hunting with high accuracy, and perform effective hunting control.

DESCRIPTION OF EMBODIMENTS

Figure 1:
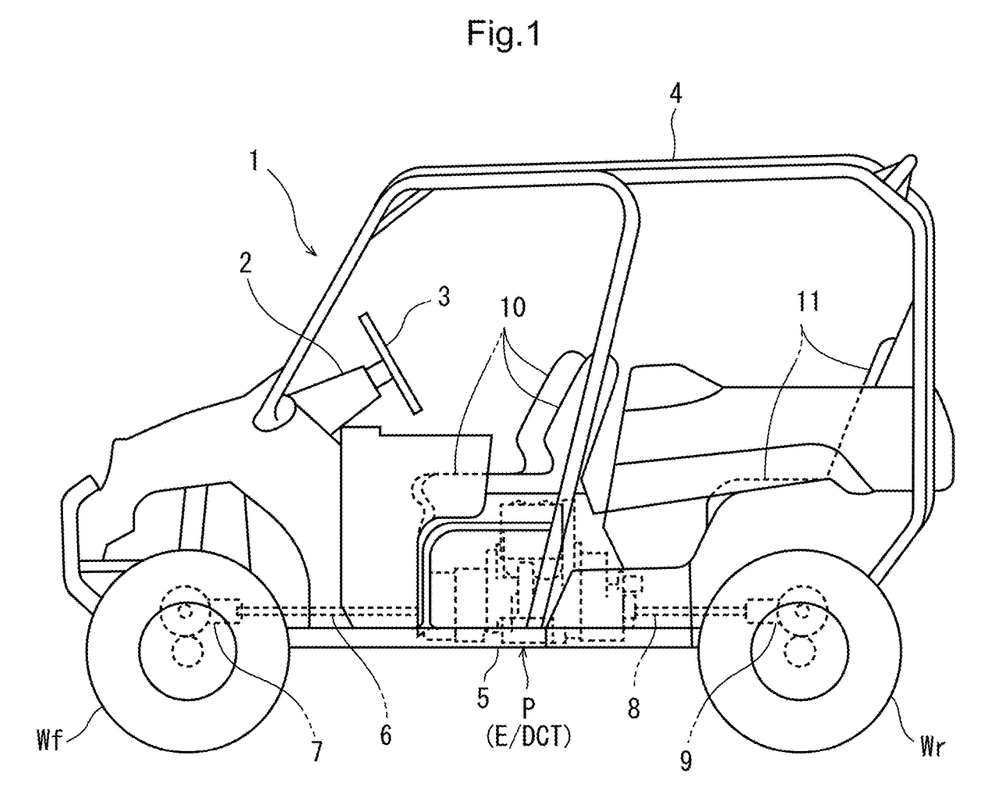
FIG. 1 is a side view of a rough terrain traveling vehicle having a DCT to which a hunting control device according to the present invention is applied.

In the following, a preferred embodiment of the present invention will be described in detail with reference to the drawings. FIG. 1 is a side view of a rough terrain traveling vehicle 1 having a DCT to which a hunting control device according to the present invention is applied.

A pair of left and right front wheels Wf and a pair of left and right rear wheels Wr that are fitted with tires for rough terrain use are respectively suspended from the front and rear of a vehicle body frame 5. A power unit P including an internal combustion engine E and a DCT is mounted in a longitudinally central position of the vehicle body frame 5. The output of the power unit P is transmitted to the left and right front wheels Wf via a front propeller shaft 6 and a front final reduction gear unit 7, and is transmitted to the left and right rear wheels Wr via a rear propeller shaft 8 and a rear final reduction gear unit 9.

Three front seats 10 are laterally arranged side by side over the power unit P. Two rear seats 11 are laterally arranged in a rear portion of the vehicle body frame 5. A steering wheel 3 is provided in front of a driver's seat so as to project from a steering column 2. A space over the front seats 10 and the rear seats 11 is covered by a roof 4.

Figure 2:
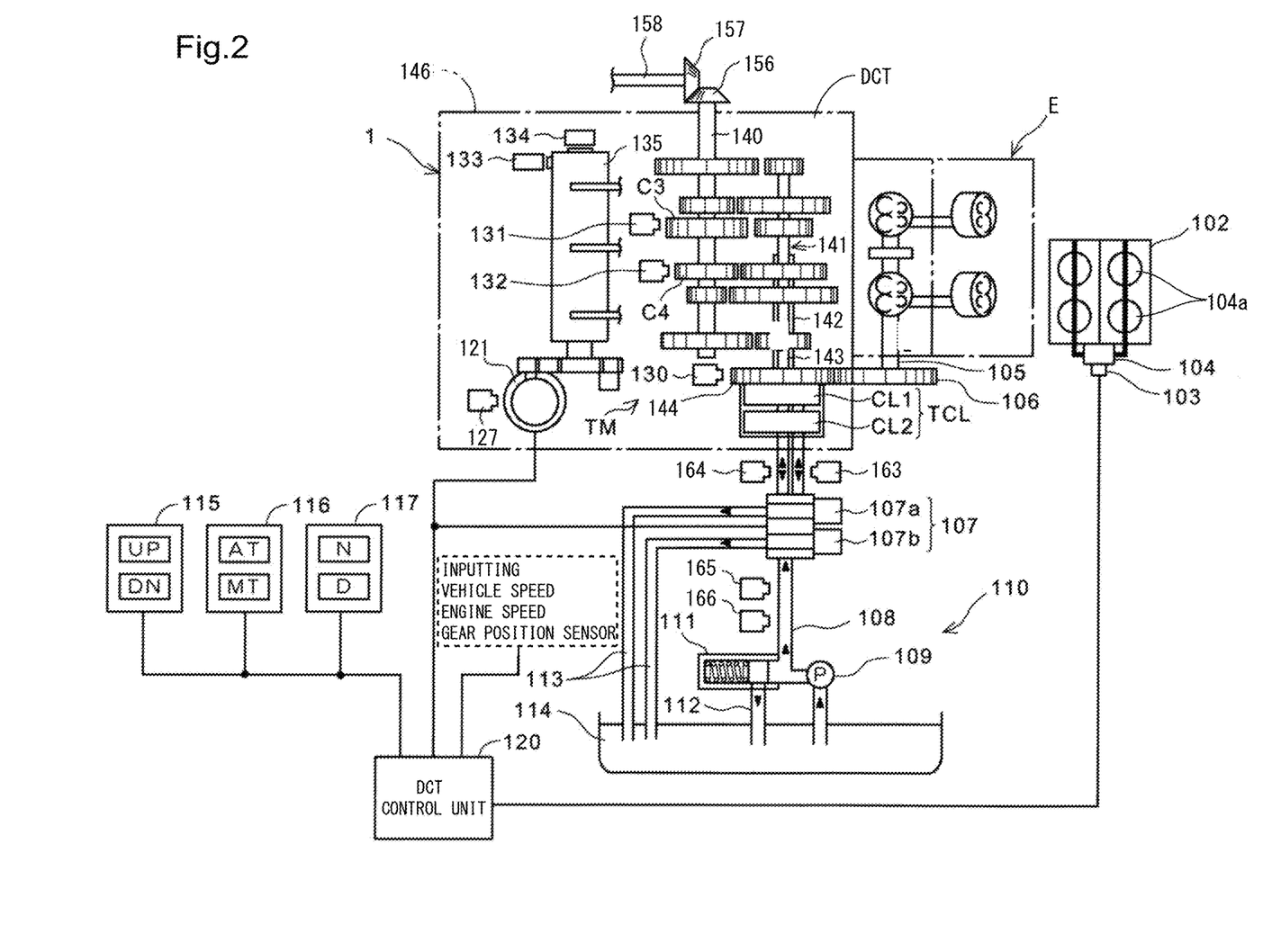
FIG. 2 is a diagram depicting a configuration of the DCT included in the power unit P and a peripheral mechanism thereof.

FIG. 2 is a diagram depicting a configuration of the DCT included in the power unit P and a peripheral mechanism thereof. The DCT connects and disconnects the rotational driving force of the engine E by two clutches CL1 and CL2 arranged on a main shaft.

The DCT is housed in a crankcase 146, and is driving-controlled by a clutch hydraulic device 110 and a DCT control unit 120. The engine E has a throttle-by-wire type throttle body 102 provided with a throttle valve motor 104 that opens and closes throttle valves 104a.

The DCT includes a transmission TM with six forward gears, a twin clutch mechanism TCL constituted of a first clutch CL1 and a second clutch CL2, a shift drum 135, and a shift control motor 121 that rotates the shift drum 135.

A large number of gears constituting the DCT are each coupled or loosely fitted to the main shaft 141 or a counter shaft 140. The main shaft 141 is constituted of an inner main shaft 143 and an outer main shaft 142. The inner main shaft 143 is coupled to the first clutch CL1. The outer main shaft 142 is coupled to the second clutch CL2. The main shaft 141 and the counter shaft 140 are each provided with speed change gears displaceable in an axial direction of the main shaft 141 and the counter shaft 140. End portions of shift forks (not depicted) are each engaged with a plurality of guide grooves formed in the speed change gears and the shift drum 135.

An output shaft of the engine E, that is, a crankshaft 105 is coupled with a primary driving gear 106. The primary driving gear 106 meshes with a primary driven gear 144. The primary driven gear 144 is coupled to the inner main shaft 143 via the first clutch CL1, and is coupled to the outer main shaft 142 via the second clutch CL2.

The DCT includes an inner main shaft number-of-rotations (rotational speed) sensor 131 and an outer main shaft number-of-rotations (rotational speed) sensor 132 that detect the rotational speeds of the inner main shaft 143 and the outer main shaft 142, respectively, by measuring the rotational speeds of predetermined speed change gears on the counter shaft 140.

The inner main shaft number-of-rotations sensor 131 detects the rotational speed of a driven side speed change gear C3 that is meshed with a speed change gear non-rotatably attached to the inner main shaft 143 and which is rotatably and non-slidably attached to the counter shaft 140. The outer main shaft number-of-rotations sensor 132 is configured to detect the rotational speed of a driven side speed change gear C4 that is meshed with a speed change gear non-rotatably attached to the outer main shaft 142 and which is rotatably and non-slidably attached to the counter shaft 140.

A bevel gear 156 is coupled to an end portion of the counter shaft 140. The bevel gear 156 meshes with a bevel gear 157 coupled to a drive shaft 158. The rotational driving force of the counter shaft 140 is thereby transmitted to the rear wheels Wr.

The DCT includes: an engine speed sensor 130 disposed so as to be opposed to the outer circumference of the primary driven gear 144; a gear position sensor 134 that detects the gear stage position of the transmission on the basis of the rotational position of the shift drum 135; a shifter sensor 127 that detects the rotational position of a shifter driven by the shift control motor 121; and a neutral switch 133 that detects that the shift drum 135 is in a neutral position. The throttle body 102 is provided with a throttle opening degree sensor 103 that detects a degree of throttle opening.

The clutch hydraulic device 110 has a configuration used for both of a lubricating oil for the engine E and a hydraulic fluid driving the twin clutches. The clutch hydraulic device 110 has an oil tank 114 and a pipe line 108 for feeding an oil (hydraulic fluid) within the oil tank 114 to the first clutch CL1 and the second clutch CL2.

A variable displacement hydraulic pump 109 as an oil pressure supply source and a valve 107 as an actuator are arranged on the pipe line 108. A regulator 111 for maintaining an oil pressure supplied to the valve 107 at a constant value is disposed on a return line 112 coupled to the pipe line 108. The valve 107 is constituted of a first valve 107a and a second valve 107b that can individually apply oil pressures to the first clutch CL1 and the second clutch CL2. The first valve 107a and the second valve 107b are each provided with an oil return line 113.

A pipe line coupling the first valve 107a and the first clutch CL1 to each other is provided with a first oil pressure sensor 163 that measures an oil pressure occurring in the pipe line, that is, an oil pressure occurring in the first clutch CL1. A pipe line coupling the second valve 107b and the second clutch CL2 to each other is provided with a second oil pressure sensor 164 that measures an oil pressure occurring in the second clutch CL2. The pipe line 108 coupling the hydraulic pump 109 and the valve 107 to each other is provided with a main oil pressure sensor 165 and an oil temperature sensor 166 as oil temperature detecting means.

The DCT control unit 120 is connected with a mode switch 116 that switches between an automatic speed change (AT) mode and a manual speed change (MT) mode, a shift selecting switch 115 that gives an upshift (UP) or downshift (DN) speed change instruction, and a neutral selecting switch 117 that switches between neutral (N) and drive (D).

The DCT control unit 120 includes a central processing unit (CPU). The DCT control unit 120 changes a speed change stage automatically or semiautomatically by controlling the valve 107 and the shift control motor 121 according to output signals of the sensors and the switches described above.

The DCT control unit 120 automatically changes a shift stage position according to information about a vehicle speed, an engine speed, a degree of throttle opening, and the like while the AT mode is selected. On the other hand, the DCT control unit 120 upshifts or downshifts the transmission TM according to an operation of the shift selecting switch 115 while the MT mode is selected. Incidentally, even when the MT mode is selected, auxiliary automatic speed change control can be performed to prevent overspeed or stalling of the engine.

In the clutch hydraulic device 110, the hydraulic pump 109 applies an oil pressure to the valve 107. The regulator 111 controls the oil pressure such that the oil pressure does not exceed an upper limit value. When the valve 107 is opened by an instruction from the DCT control unit 120, the oil pressure is applied to the first clutch CL1 or the second clutch CL2, so that the primary driven gear 144 is coupled to the inner main shaft 143 or the outer main shaft 142 via the first clutch CL1 or the second clutch CL2.

Specifically, the first clutch CL1 and the second clutch CL2 are both a hydraulic clutch of a normally open type. When the application of the oil pressure is stopped by closing the valve 107, a built-in return spring (not depicted) biases the first clutch CL1 and the second clutch CL2 in a direction of being decoupled from the inner main shaft 143 and the outer main shaft 142. A time taken for the pipe line 108 to reach a fully opened state from a fully closed state or the like can be changed arbitrarily by adjustment of a driving signal for the valve 107 by the DCT control unit 120.

The shift control motor 121 rotates the shift drum 135 according to an instruction from the DCT control unit 120. When the shift drum 135 is rotated, the shift forks (not depicted) are displaced in the axial direction of the shift drum 135 according to the shapes of guide grooves formed in the outer circumference of the shift drum 135. Engagements of the gears on the counter shaft 140 and the main shaft 141 are changed accordingly.

In the DCT, the inner main shaft 143 coupled to the first clutch CL1 is configured to support odd-numbered stage gears (first, third, and fifth gears), and the outer main shaft 142 coupled to the second clutch CL2 is configured to support even-numbered stage gears (second, fourth, and sixth gears). Hence, during traveling in the odd-numbered stage gears, oil pressure supply to the first clutch CL1 is continued, and a connected state thereof is maintained. When a shift change is performed, engagements of the gears are changed in advance by rotating the shift drum 135, and thus a speed change operation can be completed by only changing the connected states of both the clutches.

Figure 3:
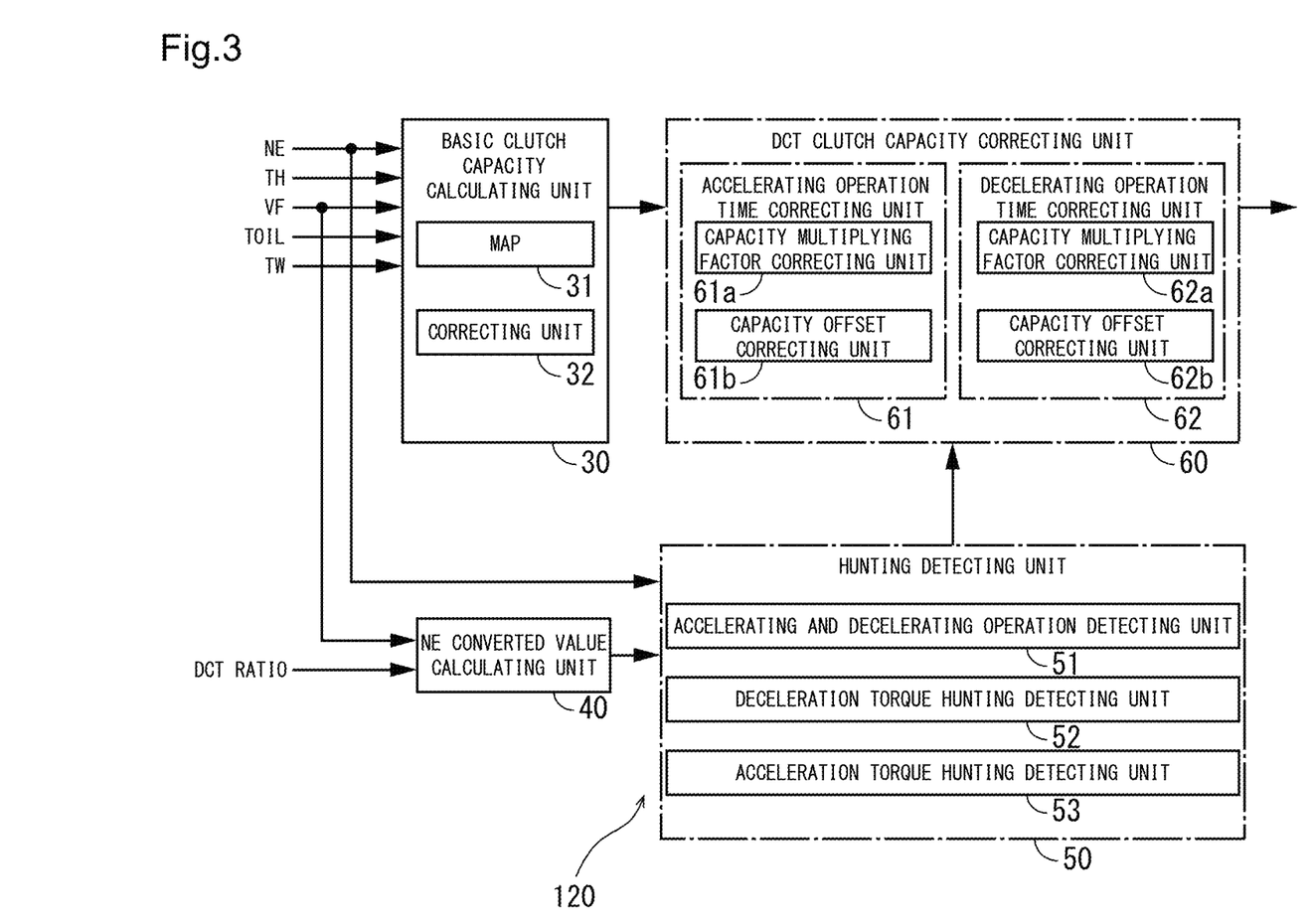
FIG. 3 is a functional block diagram depicting a configuration of the DCT control unit.

FIG. 3 is a functional block diagram depicting a configuration of the DCT control unit 120. In this case, only a configuration related to hunting control according to the present invention is illustrated in the figure, and the other configuration is not depicted in the figure.

A basic clutch capacity calculating unit 30 includes a basic clutch capacity map 31 and a correcting unit 32. The basic clutch capacity calculating unit 30 calculates the basic clutch capacity of the DCT applying an engine speed NE, a degree of throttle opening TH, and a front wheel vehicle speed VF to the map 31. The basic clutch capacity calculating unit 30 further applies an oil temperature TOIL and a water temperature TW to the correcting unit 32, and corrects the basic clutch capacity. The basic clutch capacity calculating unit 30 thereby calculates the DCT basic clutch capacity.

An NE converted value calculating unit 40 calculates an NE converted value obtained by converting a vehicle speed W into an engine speed with the front wheel vehicle speed VF and a DCT speed change stage as input parameters. A hunting detecting unit 50 detects occurrence of hunting by comparing the engine speed with the NE converted value when detecting an accelerating operation or a decelerating operation by a driver.

In the hunting detecting unit 50, an accelerating and decelerating operation detecting unit 51 determines an accelerating operation by detecting that the degree of throttle opening TH is changed from a fully closed state (OFF) to a non-fully closed state (ON), for example. The accelerating and decelerating operation detecting unit 51 determines a decelerating operation by detecting that the degree of throttle opening is changed from a non-fully closed state to a fully closed state, for example.

Figure 4:
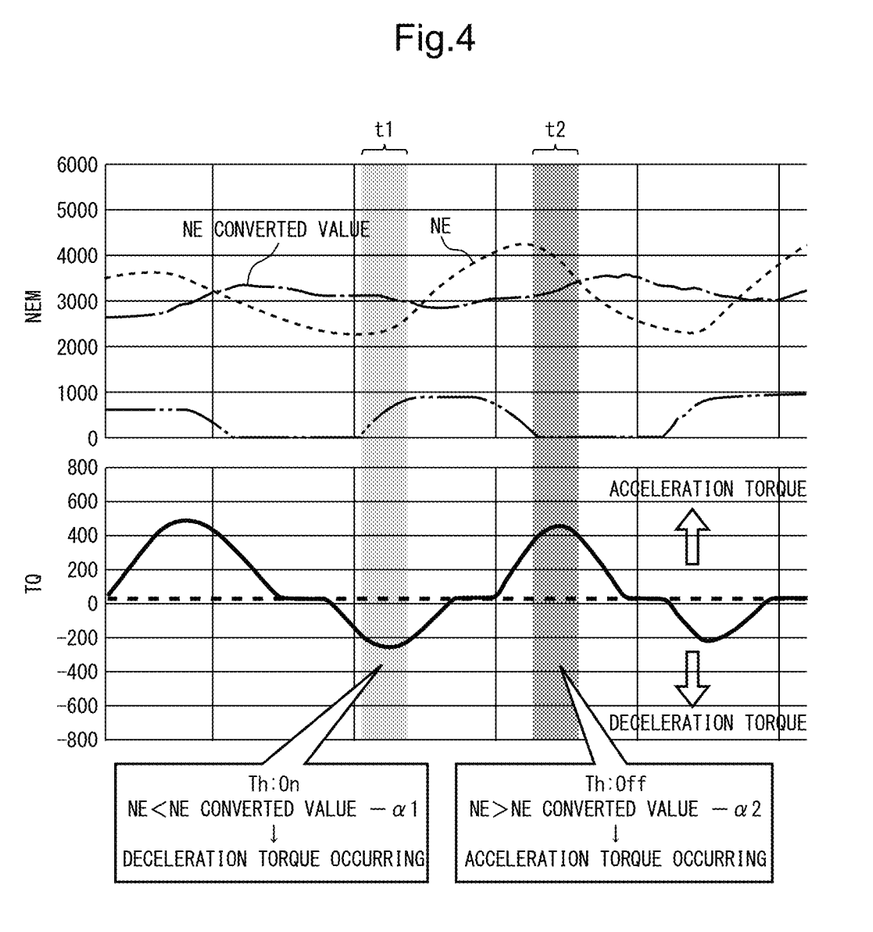
FIG. 4 is a diagram depicting a method of detecting timing of occurrence of deceleration torque hunting and acceleration torque hunting and achieving early convergence of acceleration or deceleration torque.

FIG. 4 is a diagram depicting a method of detecting timing of occurrence of deceleration torque hunting and acceleration torque hunting and achieving early convergence of acceleration or deceleration torque. When an accelerating operation such as a throttle ON operation or the like as in timing t1 in FIG. 4 is detected, and the engine speed is lower than a value obtained by subtracting a predetermined torsion index value α1 from the NE converted value, a deceleration torque hunting detecting unit 52 determines that a deceleration torque is occurring, and that hunting caused by this (which hunting may hereinafter be expressed as deceleration torque hunting) can occur.

When a decelerating operation such as a throttle OFF operation or the like as in timing t2 in FIG. 4 is detected, and the engine speed is higher than a value obtained by subtracting a predetermined torsion index value α2 from the NE converted value, an acceleration torque hunting detecting unit 53 determines that an acceleration torque is occurring, and that hunting caused by this (which hunting may hereinafter be expressed as acceleration torque hunting) can occur.

A DCT clutch capacity correcting unit 60 includes an accelerating operation time correcting unit 61 and a decelerating operation time correcting unit 62. The DCT clutch capacity correcting unit 60 basically obtains a DCT clutch capacity by multiplying the DCT basic clutch capacity by a predetermined capacity multiplying factor and further adding or subtracting a predetermined capacity offset. When the hunting detecting unit 50 detects hunting, the DCT clutch capacity correcting unit 60 makes a decreasing correction that decreases the capacity multiplying factor and the capacity offset.

The DCT control unit 120 controls the opening/closing time of the valve 107 on the basis of the capacity multiplying factor and the capacity offset. Hence, when the decreasing correction of the capacity multiplying factor and the capacity offset is made, the oil pressure applied to the DCT is lowered, and thereby the DCT clutch capacity is decreased. The hunting is therefore suppressed.

In the accelerating operation time correcting unit 61, a capacity multiplying factor correcting unit 61a adopts a first capacity multiplying factor as the capacity multiplying factor when the deceleration torque hunting is detected. When the engine speed becomes higher than the value obtained by subtracting the predetermined torsion index value $\alpha 1$ from the NE converted value, the accelerating operation time correcting unit 61 makes a transition to a second capacity multiplying factor and maintains the second capacity multiplying factor for a predetermined first time, and thereafter makes a gradual transition from the second capacity multiplying factor to a standard multiplying factor while taking a first return time. The first and second capacity multiplying factors, the first time, and the first return time are a function of the DCT speed change stage.

The first capacity multiplying factor is a multiplying factor suitable for suppressing torque occurrence by making the clutch slip during occurrence of a deceleration torque. The second capacity multiplying factor is a multiplying factor suitable for suppressing an excessive torque occurring before a backlash of a driving system moves to an acceleration side after a transition is made to acceleration. Hence, First Capacity Multiplying Factor≤Second Capacity Multiplying Factor in the present embodiment.

The capacity offset correcting unit 61b adopts a first offset value as the capacity offset when the deceleration torque hunting is detected. When the engine speed becomes higher than a value obtained by subtracting a predetermined torsion index value $\beta 1$ from the NE converted value, the capacity offset correcting unit 61b makes a transition to a second offset value and maintains the second offset value for a predetermined second time, and thereafter makes a gradual transition from the second offset value to a standard offset value while taking a second return time. The first and second offset values are a function of a gear ratio, and can assume a negative value.

On the other hand, in the decelerating operation time correcting unit 62, a capacity multiplying factor correcting unit 62a adopts a third capacity multiplying factor as the capacity multiplying factor when the acceleration torque hunting is detected. When the engine speed becomes lower than a value obtained by subtracting a predetermined torsion index value $\beta 2$ from the NE converted value, the capacity multiplying factor correcting unit 62a makes a transition to a fourth capacity multiplying factor and maintains the fourth capacity multiplying factor for a predetermined third time, and thereafter makes a gradual transition from the fourth capacity multiplying factor to the standard multiplying factor while taking a third return time. The third and fourth capacity multiplying factors, the third time, and the third return time are a function of the DCT speed change stage.

A capacity offset correcting unit 62b adopts a third offset value as the capacity offset value when the acceleration torque hunting is detected. When the engine speed becomes lower than the value obtained by subtracting the predetermined torsion index value $\beta 1$ from the NE converted value, the capacity offset correcting unit 62b makes a transition to a fourth offset value and maintains the fourth offset value for a predetermined fourth time, and thereafter makes a gradual transition from the fourth offset value to the standard offset value while taking a fourth return time. The third and fourth offset values are a function of the DCT speed change stage, and can assume a negative value.

Figure 7:
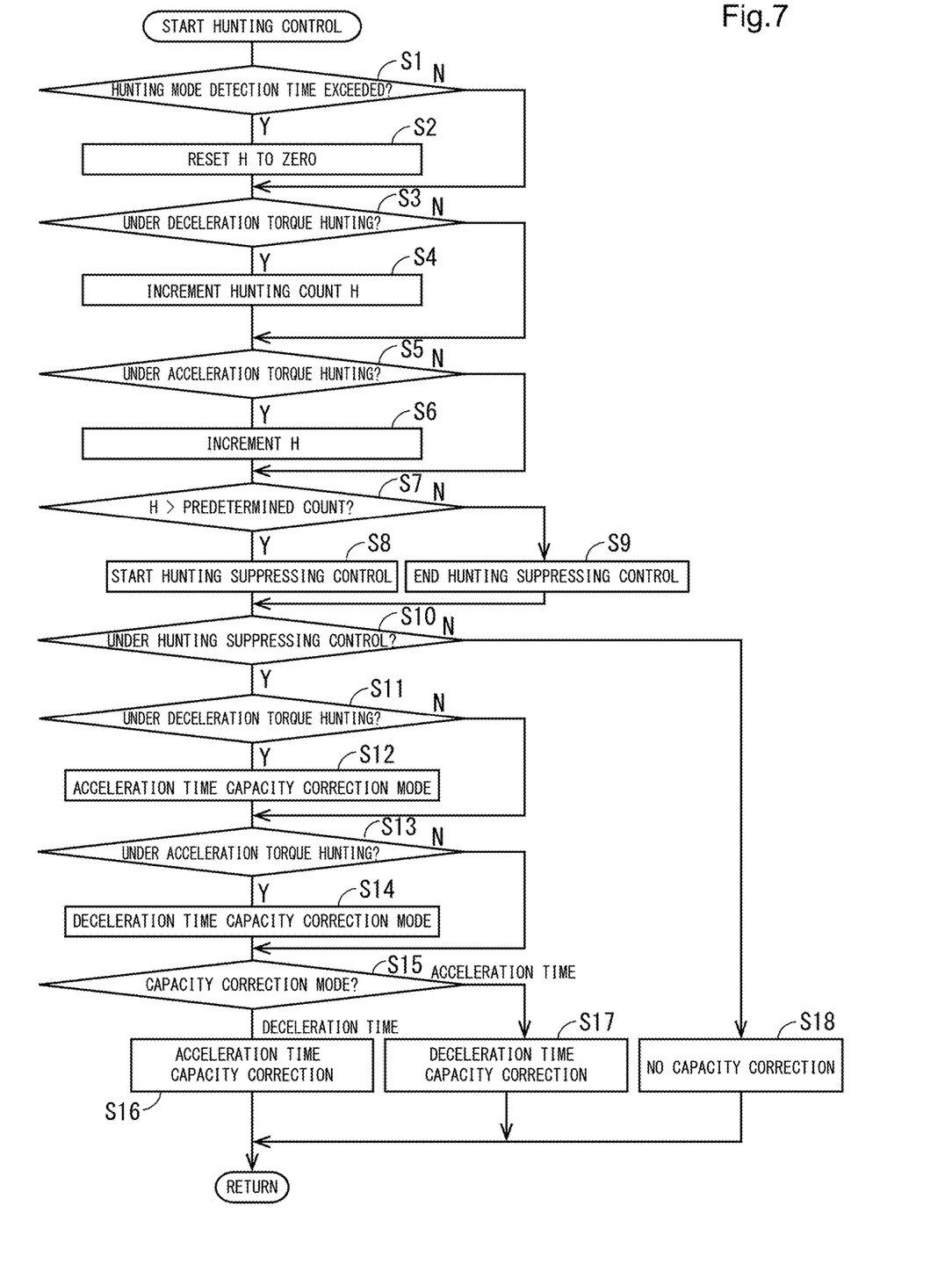
FIG. 7 is a flowchart depicting a procedure of hunting suppressing control.

FIG. 7 is a flowchart depicting a procedure of hunting suppressing control by cooperation of the hunting detecting unit 50 and the DCT clutch capacity correcting unit 60. In step S1, whether or not a predetermined hunting mode detection time has passed is determined. When the predetermined hunting mode detection time has passed, the processing proceeds to step S2, where a hunting count H is reset (=0).

In step S3, the deceleration torque hunting detecting unit 52 determines whether or not there are conditions where the above-described deceleration torque hunting can occur on the basis of the engine speed, the NE converted value, and the presence or absence of the above-described accelerating or decelerating operation. When there are conditions where the deceleration torque hunting can occur, the processing proceeds to step S4, where the hunting count H is incremented (+1).

In step S5, the acceleration torque hunting detecting unit 53 determines whether or not there are conditions where the above-described acceleration torque hunting can occur on the basis of the engine speed, the NE converted value, and the presence or absence of the above-described accelerating or decelerating operation. When there are conditions where the acceleration torque hunting can occur, the processing proceeds to step S6, where the hunting count H is incremented.

In step S7, whether or not the hunting count H has reached a predetermined reference count Href is determined. When H>Href, the processing proceeds to step S8, where the hunting suppressing control is started. When H is not higher than Href, the processing proceeds to step S9, where the hunting suppressing control is ended.

In step S10, whether or not the hunting suppressing control is being performed is determined. When the control is not being performed, the processing proceeds to step S18, where capacity correction for the hunting control is canceled, and the clutch capacity is controlled to approximately 1.2 to 1.6 times the DCT basic clutch capacity, for example, as a standard capacity.

When the hunting suppressing control is being performed, on the other hand, the processing proceeds to step S11, where the deceleration torque hunting detecting unit 52 determines whether or not there are conditions where the above-described deceleration torque hunting can occur on the basis of the engine speed, the NE converted value, and the presence or absence of the above-described accelerating or decelerating operation. When there are conditions there the deceleration torque hunting can occur, the processing proceeds to step S12, where an acceleration time capacity correction mode is started.

In step S13, the acceleration torque hunting detecting unit 53 determines whether or not there are conditions where the above-described acceleration torque hunting can occur on the basis of the engine speed, the NE converted value, and the presence or absence of the above-described accelerating or decelerating operation. When there are conditions where the acceleration torque hunting can occur, the processing proceeds to step S14, where a deceleration time capacity correction mode is started.

In step S15, a present capacity correction mode is determined. In a case of the acceleration time capacity correction mode, the processing proceeds to step S16, where the DCT basic clutch capacity is multiplied by a capacity multiplying factor corresponding to the mode, and further an offset amount corresponding to the mode is added to the DCT basic clutch capacity multiplied by the capacity multiplying factor corresponding to the mode. In a case of the deceleration time capacity correction mode, the processing proceeds to step S17, where the DCT basic clutch capacity is multiplied by a capacity multiplying factor corresponding to the mode, and further an offset amount corresponding to the mode is added to the DCT basic clutch capacity multiplied by the capacity multiplying factor corresponding to the mode.

According to the present invention, an NE converted value, which is obtained by converting the rotational speed of a driving wheel into an engine speed on the basis of the gear ratio of a DCT is calculated, and a residual torsion of the driving system is measured by comparing the NE converted value and the engine speed with each other. Thus, it is possible to measure the torsion of the driving system quantitatively without separately providing a dedicated mechanism for detecting the torsion.

Furthermore, according to the present invention, an accelerating or decelerating operation is detected on the basis of a change in a degree of throttle opening, and performs hunting suppressing control on condition that a throttle ON operation or a throttle OFF operation be detected. Thus, the hunting suppressing control can be prevented from being performed in conditions in which hunting cannot occur because no accelerating or decelerating operation is performed even when a residual torsion occurs in the driving system. Hence, it is possible to detect hunting with high accuracy, and perform effective hunting control.

REFERENCE SIGNS LIST

1 . . . rough terrain traveling vehicle, 5 . . . vehicle body frame, 6 . . . front propeller shaft, 7 . . . front final reduction gear unit, 8 . . . rear propeller shaft, 9 . . . rear final reduction gear unit, 30 . . . basic clutch capacity calculating unit, 40 . . . NE converted value calculating unit, 50 . . . hunting detecting unit, 60 . . . DCT clutch capacity correcting unit, 120 . . . DCT control unit

What is claimed is:

1. A hunting control device for a vehicle with a DCT transmission, the vehicle causing a driving force from an engine to be transmitted to a driving wheel via the DCT transmission and a propeller shaft, the hunting control device comprising:
a speed sensor configured to detect an engine speed;
a rotation sensor configured to detect a rotational speed of the driving wheel;
a processor configured to:
calculate an NE converted value obtained by converting the rotational speed of the driving wheel into an engine speed on a basis of a gear ratio of the DCT transmission;
detect occurrence of hunting by comparing the NE converted value with the engine speed;
make decreasing correction of a DCT clutch capacity when hunting is detected, and
detect an accelerating or decelerating operation on a basis of a change in a degree of throttle opening,
wherein the processor is configured to detect occurrence of hunting by detecting hunting due to deceleration torque when the engine speed is smaller than a value obtained by subtracting a predetermined torsion index value $\alpha 1$ from the NE converted value in a case where an accelerating operation is detected.

2. The hunting control device for a vehicle with a DCT transmission according to claim 1, wherein
the processor is configured to detect occurrence of hunting by further detecting hunting due to acceleration torque when the engine speed is higher than a value obtained by subtracting a predetermined torsion index value $\alpha 2$ from the NE converted value in a case where a decelerating operation is detected.

3. The hunting control device for a vehicle with a DCT transmission according to claim 1, wherein
the processor is configured to detect the accelerating or decelerating by determining that an accelerating operation is performed when detecting that the degree of throttle opening is changed from a fully closed state to a non-fully closed state, and determining that a decelerating operation is performed when detecting that the degree of throttle opening is changed from a non-fully closed state to a fully closed state.

4. The hunting control device for a vehicle with a DCT transmission according to claim 2, wherein
the processor is configured to detect the accelerating or decelerating by determining that an accelerating operation is performed when detecting that the degree of throttle opening is changed from a fully closed state to a non-fully closed state, and determining that a decelerating operation is performed when detecting that the degree of throttle opening is changed from a non-fully closed state to a fully closed state.

5. The hunting control device for a vehicle with a DCT transmission according to claim 1, wherein
the processor is configured to make the decreasing correction of the DCT clutch capacity when hunting is detected by multiplying a basic clutch capacity obtained on a basis of the degree of throttle opening by a predetermined capacity multiplying factor and a predetermined capacity offset value.

6. The hunting control device for a vehicle with a DCT transmission according to claim 2, wherein
the processor is configured to make the decreasing correction of the DCT clutch capacity when hunting is detected by multiplying a basic clutch capacity obtained on a basis of the degree of throttle opening by a predetermined capacity multiplying factor and a predetermined capacity offset value.

7. The hunting control device for a vehicle with a DCT transmission according to claim 3, wherein
the processor is configured to make the decreasing correction of the DCT clutch capacity when hunting is detected by multiplying a basic clutch capacity obtained on a basis of the degree of throttle opening by a predetermined capacity multiplying factor and a predetermined capacity offset value.

8. The hunting control device for a vehicle with a DCT transmission according to claim 4, wherein
the processor is configured to make the decreasing correction of the DCT clutch capacity when hunting is detected by multiplying a basic clutch capacity obtained on a basis of the degree of throttle opening by a predetermined capacity multiplying factor and a predetermined capacity offset value.

9. The hunting control device for a vehicle with a DCT transmission according to claim 5, wherein
when the hunting due to the deceleration torque is detected, a first capacity multiplying factor is adopted as the first capacity multiplying factor, and when the engine speed becomes higher than the value obtained by subtracting the predetermined torsion index value α1 from the NE converted value, a transition is made to a second capacity multiplying factor, and the second capacity multiplying factor is maintained for a predetermined first time, and subsequently a gradual transition is made from the second capacity multiplying factor to a standard multiplying factor while taking a first return time.

10. The hunting control device for a vehicle with a DCT transmission according to claim 9, wherein
the first and second capacity multiplying factors, the first time, and the first return time are a function of the gear ratio of the DCT transmission.

11. The hunting control device for a vehicle with a DCT transmission according to claim 9, wherein
when the hunting due to the deceleration torque is detected, a first offset value is adopted as the first capacity offset value, and when the engine speed becomes higher than the value obtained by subtracting the predetermined torsion index value α1 from the NE converted value, a transition is made to a second offset value, and the second offset value is maintained for a predetermined second time, and subsequently a gradual transition is made from the second offset value to a standard offset value while taking a second return time.

12. The hunting control device for a vehicle with a DCT transmission according to claim 11, wherein
the first and second offset values are a function of the gear ratio.

13. The hunting control device for a vehicle with a DCT transmission according to claim 11, wherein
the first and second offset values are negative.

14. The hunting control device for a vehicle with a DCT transmission according to claim 11, wherein
when the hunting due to an acceleration torque is detected, a third capacity multiplying factor is adopted as the capacity multiplying factor, and when the engine speed becomes lower than the value obtained by subtracting a predetermined torsion index value β1 from the NE converted value, a transition is made to a fourth capacity multiplying factor, and the fourth capacity multiplying factor is maintained for a predetermined third time, and subsequently a gradual transition is made from the fourth capacity multiplying factor to a standard multiplying factor while taking a third return time.

15. The hunting control device for a vehicle with a DCT transmission according to claim 14, wherein
the third and fourth capacity multiplying factors, the third time, and the third return time are a function of the gear ratio of the DCT transmission.

16. The hunting control device for a vehicle with a DCT transmission according to claim 14, wherein
when the hunting due to the acceleration torque is detected, a third offset value is adopted as the capacity offset value, and when the engine speed becomes lower than the value obtained by subtracting the predetermined torsion index value β1 from the NE converted value, a transition is made to a fourth offset value, and the fourth offset value is maintained for a predetermined fourth time, and subsequently a gradual transition is made from the fourth offset value to a standard offset value while taking a fourth return time.

17. The hunting control device for a vehicle with a DCT transmission according to claim 16, wherein
the third and fourth offset values are a function of the gear ratio.

18. The hunting control device for a vehicle with a DCT transmission according to claim 1, wherein
the processor is configured to make the decreasing correction of the DCT clutch capacity by decreasing a displacement of a variable displacement hydraulic pump that supplies an oil pressure to the DCT transmission.

19. The hunting control device for a vehicle with a DCT transmission according to claim 1, wherein
the processor is configured to not make the decreasing correction of the DCT clutch capacity when vehicle speed exceeds a speed at a time of a start.

* * * * *